Nov. 29, 1949    F. CZAPAR, JR    2,489,483
MANUALLY OPERABLE MEAT CLEANING IMPLEMENT
HAVING AN ELASTIC SCRAPING EDGE
Filed Feb. 18, 1948

INVENTOR.
Frank Czapar, Jr.
BY
ATTORNEY

Patented Nov. 29, 1949

2,489,483

UNITED STATES PATENT OFFICE 2,489,483

MANUALLY OPERABLE MEAT CLEANING IMPLEMENT HAVING AN ELASTIC SCRAPING EDGE

Frank Czapar, Jr., San Diego, Calif.

Application February 18, 1948, Serial No. 9,236

2 Claims. (Cl. 15—245)

This invention relates to a manually operable meat cleaning implement having an elastic scraping edge.

This utensil is capable of being advantageously used to perform a great variety of scraping operations, but is more particularly intended for use in removing bone dust and loose particles from steaks and other sawed-off cuts made by the butcher when retailing meat to his customers.

Fat and bone dust particles cling quite tenaceously to the sawed-off cuts of meat, particularly when a power driven saw is used, and their efficient removal, without the expenditure of much labor and time, has been a difficult problem since the power driven meat saw has come into use.

Heretofore it has been a common practice of butchers to wipe the loose particles off from the meat with a dampened cheese cloth or rough Turkish towel, even though, after using such a wiper for a few minutes it would become saturated with bone particles, fat and meat juices, from which unsanitary condition it would be necessary to cleanse it by frequent washings in hot water, so as to loosen and remove therefrom accumulated waste materials. Very few butchers will take the pains to wash such wipers as often and thoroughly as is needful. Hence such cloths are often allowed to lay around meat blocks for hours without being cleaned. This unsanitary practice is offensive to all meat customers, for no purchaser of meat likes to see his or her meat cutter clean the steaks or roasts being purchased by wiping them off with a dirty cloth or towel. Moreover this unsanitary practice is apt to be made worse by using the same meat-wiping towels for wiping off hands, meat blocks and dirty pans or meat trays.

Meats that are cleaned dry, as is provided for by this invention, retain their bloom and color longer, than when wiped by a damp piece of fabric. Also, the juicy part of the meat is not wasted as sometimes occurs when an instrument with an unyielding metal edge is used to perform the scraping operation.

With a view to overcoming the foregoing and other defects in the art to which the invention pertains, among the objects of said invention are: to provide a meat cleaning implement that will not moisten the meat and which will, therefore, cleanse the meat without detracting from its color; to provide a cleaner and more sanitary means for removing bone dust and other objectionable materials from the surface of the meat; and to provide a meat cleaning implement which will produce a more favorable reaction in the minds of customers when watching its operation.

Other objects and advantages pertain to the provision of a meat scraping means having a scraping edge which operates efficiently but is not so sharp as to scrape off an unnecessary amount of the natural juice in the meat; and to provide a scraper edge so constructed as to afford a corner curve particularly well adapted to clean meat adjacent curved or irregular bone formations.

Prior to this invention, scraping devices have been made among which can be found implements capable of attaining one or more of the aforementioned objects, but heretofore no single implement has been marketed combining all of said objects, and wherewith a butcher can efficiently scrape the surface of a sawed through piece of meat having upon it bony portions and variously contoured depressions adjacent to the bone. The present invention has been produced with a view to solving the above indicated problem.

Other objects, advantages and features of invention will hereinafter appear.

Referring to the accompanying drawing, which illustrates a preferred, reduced to practice embodiment of the invention:

Figure 1:
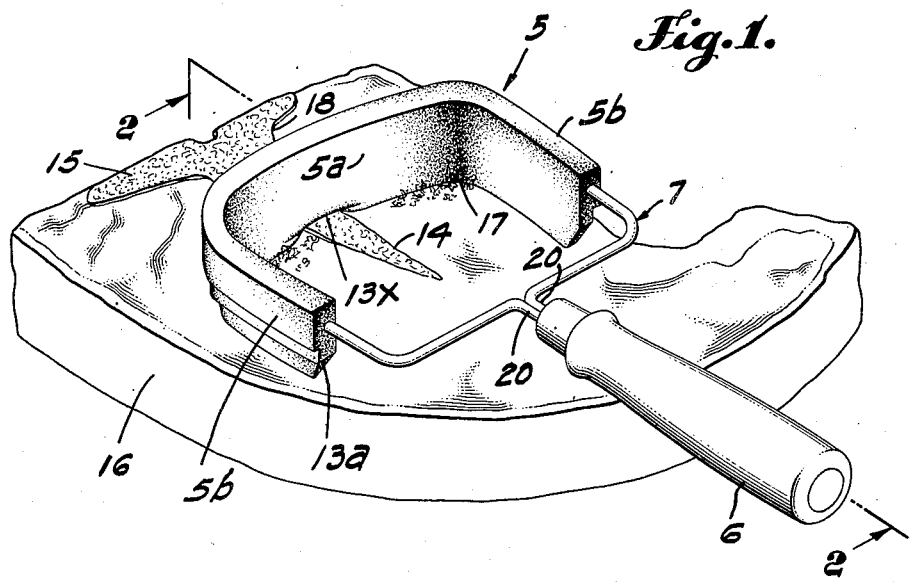
Fig. 1 is a perspective view of the implement showing it positioned for use upon a T-bone cut of meat.

Referring in detail to the drawing, the main parts of the scraping implement shown are the broadly U-shaped scraper proper 5, the handle 6 and the looped wire member 7 which supports said scraper proper in a spaced relation to said handle.

Figure 2:
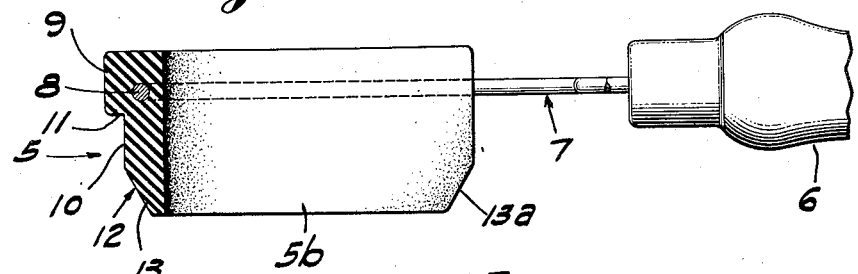
Fig. 2 is a longitudinal midsection of the implement, per se, the greater portion of the handle thereof being broken away in order to contract the view. The plane of section is indicated by line 2—2 on Fig. 1, but the implement is shown upon a considerable larger scale than in the latter view.
Figure 3:
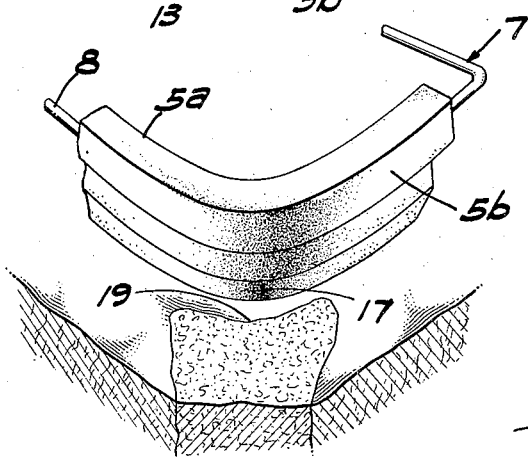
Fig. 3 is a fragmentary perspective view illustrating the application of a corner portion of the scraper to scrape the meat adjacent a bone having a curved edge.

The U-shaped scraper member 5 is made of form-retaining rubber or rubber-like material, the wire 7 having a rectangularly looped end portion 8 the outer portion of which extends longitudinally through and is embedded within the wire member 5 as shown in the drawing, the wire member 5 occupying the upper part of the member 5 when the implement is in its operative position shown in Fig. 1. In manufacturing the implement, the elastic portion thereof is extruded from a die as a straight strip having the cross-section shown in Fig. 2, with a longitudinal passage for the insertion and subsequent bending of the loop portion of the wire 8.

Said U-shaped member 5, in its operative position and as viewed in cross-section has a thickened rim 9 along the lower side of which runs a downwardly extending flange 10 of less thickness than said rim, this flange having its inner side flush with the inner side of the rim but being inset from the outer side of the rim so as to provide around the scraper a downwardly directed shoulder 11. The lower edge portion of said flange is externally beveled at 12, thus providing a scraping lip 13 which extends along one lateral edge both of the basal and arm portions of the U-shaped scraper proper, and has chamfered end portions 13a.

By beveling this lip in the aforesaid manner, the somewhat flexible material of which it is composed is rendered sufficiently pliable to conform itself to considerable surface irregularity in the piece of meat being scraped, as illustrated in Fig. 1 where said lip is shown conforming itself to the tapered part 14 of a T-bone 15 contained in a steak 16 that is being scraped by the implement. The bone part 14 will normally have very nearly the same surface level as the softer flesh portion of the steak, but the surface of the latter portion of the steak will be slightly depressed by the scraper when applied under some pressure in order to ensure efficient scraping off of the refuse particles. Hence the bone will project slightly at such time, but will not interfere with efficient scraping of the meat, this being ensured by reason of the aforesaid yielding character of the lip 13, as shown at 13x.

It will be observed that the broadly U-shaped rubber or rubber-like body which forms the scraper proper has a slightly curved central or basal run 5a as shown in Fig. 1 and twin straight end runs or arms 5b. The slight curvature of said basal run aids the user in scraping efficiently broad, shallow depressions in the cut of meat being cleaned.

Owing to the rounded character of each corner portion 17 of the lip 13 of the scraper proper, both of these corner portions of said lip may be advantageously used to scrape loose particles out of depressions in the surface of the meat cut being cleaned where bone curves occur as indicated by numerals 18 and 19. At times the lip portions of the arms of the U-shaped elastic member 5 will aid in the scraping operation as they are utilizable in moving loose particles near the side edges of the surface of the meat toward the center thereof so as to bring them in the path of the lip of the basal run of the U member. All portions of the edge of the scraping lip normally lie in the same plane.

The already mentioned one-piece rectangular wire frame 7 has its end portions arranged to form two cooperating shanks 20, or it may be said, a single, two-part shank which is embedded axially within the handle 5 in any well-known manner.

It will be observed that, by this invention, a simple meat cleaner is provided that is easy to keep clean, capable of being manufactured at a low cost and light and convenient for one hand operation, making it acceptable to the trade. This implement may be used to advantage on any of the various cuts, for example on shoulder roasts or steaks, as well as on T-bone steaks, cuts of widely varying widths being cleaned with equal efficiency.

The bone and fat dust collects on the scraping lip and builds up on the superjacent portion of the implement. This may readily be cleaned off by turning the implement over and then tapping it on the meat block.

I claim:

1. In a meat scraper, a strip of form-retaining material shaped as a U having a slight outward basal curve and a more abrupt outward curve connecting each end of said basal curve with the arm at its side of the U, said strip having a narrowed elastic lip portion along one lateral edge of both of said arms and of the intervening basal part of the U, a wire extending longitudinally through said strip and projecting from the ends of the arms thereof, each projecting portion of said wire having an inwardly directed run which meets the corresponding inwardly directed run of the other projecting portion opposite to the midwidth of the U and thence is continued in contingent relation with the other projecting portion away from the open side of the U as a terminal shank-forming run, and an elongated handle in a secured relation to said shank-forming runs, the longitudinal axis of said handle lying in a plane which is in an adjacent, parallel relation to the plane occupied by the outer edge of the aforesaid lip portion.

2. In a meat scraper, a strip of form-retaining material shaped as a U having a slight outward basal curve and a more abrupt outward curve connecting each end of said basal curve with the arm at its side of the U, said strip having a narrowed elastic lip portion along one lateral edge of both of said arms and of the intervening basal part of the U, a wire extending longitudinally through said strip and projecting from the ends of the arms thereof, each projecting portion of said wire having an inwardly directed run which meets the corresponding inwardly directed run of the other projecting portion opposite to the midlength of the U and thence is continued in contingent relation with the other projecting portion away from the open side of the U as a terminal shank-forming run, and an operating handle in a secured relation to said shank-forming runs.

FRANK CZAPAR, Jr.

REFERENCES CITED

The following references are of record in the file of this patent:

UNITED STATES PATENTS

| Number | Name | Date |
| --- | --- | --- |
| 209,360 | Rounds et al. | Oct. 29, 1878 |
| 603,414 | Sweeney | May 3, 1898 |
| 697,336 | Hagerty | Apr. 8, 1902 |
| 1,657,752 | Hertzberg | Jan. 31, 1928 |
| 1,934,556 | Pelz | Nov. 7, 1933 |
| 2,445,140 | Hanington | July 13, 1948 |
| 2,265,551 | Steccone | Dec. 9, 1941 |